United States Patent
Cox et al.

(10) Patent No.: US 6,607,997 B1
(45) Date of Patent: Aug. 19, 2003

(54) CORE MATERIAL FOR CLOSED MOULD SYSTEMS

(75) Inventors: Marinus Jacob Franciscus Cox, Tiel (NL); D. A. Bovenschen, Rehswoude (NL); P. Anjema, Veewendaal (NL)

(73) Assignee: Lantor B.V., Veenendaal (NL)

( * ) Notice: Subject to any disclaimer, the term of this patent is extended or adjusted under 35 U.S.C. 154(b) by 0 days.

(21) Appl. No.: 09/464,632

(22) Filed: Dec. 15, 1999

(30) Foreign Application Priority Data

Dec. 16, 1998 (EP) .............................. 98204292

(51) Int. Cl.⁷ ................................. B32B 5/24
(52) U.S. Cl. .................... 442/374; 428/304.4; 442/375; 442/417
(58) Field of Search ................. 428/304.4; 442/375, 442/370, 374, 417

(56) References Cited

U.S. PATENT DOCUMENTS

| | | | |
|---|---|---|---|
| 4,902,215 A | * | 2/1990 | Seemann, III ............... 156/382 |
| 4,939,020 A | | 7/1990 | Takashima et al. ......... 428/220 |
| 5,061,418 A | * | 10/1991 | Ware .......................... 264/321 |
| 5,242,651 A | * | 9/1993 | Brayden et al. ............ 156/285 |
| 5,484,634 A | * | 1/1996 | Schutze ..................... 428/36.1 |

FOREIGN PATENT DOCUMENTS

| | | |
|---|---|---|
| EP | 0 041 054 A | 12/1981 |
| EP | 0 184 596 A | 6/1986 |
| EP | 0 190 788 A | 8/1986 |
| EP | 0 895 843 A1 | 2/1999 |
| GB | 1 427 647 A | 3/1976 |
| WO | WO 92 22420 A | 12/1992 |

OTHER PUBLICATIONS

De Jonge, S., European Search Report on European Patent Application No. EP 98204292, May 12, 1999, pp. 1–3.

* cited by examiner

*Primary Examiner*—Allan R. Kuhns
(74) *Attorney, Agent, or Firm*—Jenkens & Gilchrist, P.C.

(57) ABSTRACT

The invention is concerned with a core material suitable for use in closed mould systems, based on at least one fibrous web containing a foam-structure within the web, said core material having a compression-resistance of greater than 90% at 1 bar pressure, and a permeability for resin of more than $5 \times 10^{-9}$ m².

16 Claims, No Drawings

CORE MATERIAL FOR CLOSED MOULD SYSTEMS

The invention relates to a core material for use in the production of fibre reinforced plastics materials, more in particular suitable for application in closed mould systems.

Plastics reinforced with fibrous webs, are often used for manufacturing shaped articles such as automotive or industrial parts, e.g. tanks, bath tubs, road signs, cladding panels, boats, caravans, etc.

Fibrous .webs, such as webs of natural fibre, glass fibre, metal fibre, ceramic fibre or synthetic fibres, such as acrylic, polyethylene, polyester, polyamide (aramide), carbon or polypropylene fibres, are suitable as a reinforcement for all kinds of cured synthetic plastics materials, such as polyester resin or epoxy resin. Generally, the incorporation of a fibrous web in a resin material results in increased strength, stiffness, fatigue life, fracture toughness, environmental resistance, increased temperature stability, reduced weight and manufacturing cost of said resin material.

Use of core materials in fibre reinforced plastics has already been know for decades. The aim thereof is on the one hand to decrease the amount of resin required, resulting in cost and weight savings, and on the other hand to improve some mechanical properties of the material, more in particular the bending stiffness.

A well-known type of core material is Coremat™ of Applicant, based on microsphere impregnated non-wovens.

U.S. Pat. No. 3,676,288 discloses the application to, or incorporation in, a fibrous web of non-expanded microspheres by means of a binder, for example, a polyacrylonitrile latex. As the binder is dried and crosslinked, the spheres are attached to the fibrous web and expanded.

The European patent application 0 190 788 is directed to the use of a fibrous web of, for instance, glass fibre, incorporating microspheres, for the manufacture of objects reinforced with such a fibrous web. According to the invention of said patent application, the microspheres are mainly contained within the web and arranged in a pattern in which areas of the web, which contain microspheres, are separated from each other by areas which contain virtually no microspheres.

In the production of fibre reinforced plastics materials two prominent methods are available, one being based on the manual impregnation of the fibre materials (hand lay-up; spray-up) and another being based on the use of closed moulds. In the latter, automated system the fibre reinforcing material is placed in a mould, which is closed and subsequently filled with resin. An important advantage of these closed mould systems resides i.a. in the reproducibility of the properties of the product (better tolerances) in environmental considerations, in enhanced surface properties and in enhanced mechanical properties. It is also possible to apply higher fibre volume fractions.

Use of the above described core materials in closed mould systems has not become widespread due to the difficulties in reconciling the various requirements to be met by a core material for use therein.

These properties are i.a.

good compression resistance, fast flow of resin through the core material in all directions, low resin uptake, decreased shrink (i.e. compensate for resin shrinkage), and good drapability (i.e. low bending stiffness).

In particular the first two requirements are very difficult to reconcile. It will be clear, that the open structure that is necessary for obtaining a good resin flow in the plane of the core material, will tend to be at the expense of the compression-resistance. Further, a low resin uptake, which can be obtained by a large volume of foam in the web, will be incompatible with the good flow of resin.

Also the drapability characteristics are not easily compatible with the compression resistance and the low resin uptake.

Accordingly the inventors have set themselves the task of trying to reconcile at least some of these requirements, thereby providing a core material suitable for the use in closed mould systems.

The invention is based thereon, that the inventors have found that by carefully balancing the properties of the various components, fibres, binder, foam structure and the like, an optimal balance between the contrary properties is obtained. The invention is accordingly directed to a core material suitable for use in closed mould systems, based on at least one fibrous web containing a foam-structure within the web, said core material having a compression resistance of more than of more than 90%, preferably more than 95% at 1 bar pressure, and a permeability for resin of more than $5 \times 10^{-9}$ m$^2$. In core materials containing open channels, the permeability (k) is defined according to the law of Darcy for steady flow as $$q = \frac{k \cdot A}{\eta} \cdot \frac{\Delta p}{\Delta x},$$

wherein q is the resin flow in m$^3$/s, A is the total surface of the cross section through which the resin flows in m$^2$, $\eta$ is the viscosity of the resin in Ns/m$^2$, $\Delta p$ is the pressure difference in N/m$^2$ and $\Delta x$ is the distance over which the pressure difference exists and the resin flows in m. The permeability is defined in the plane of the material, that is not perpendicular to the material, but parallel to the upper and lower surface thereof.

According to a preferred embodiment the fibrous web containing a foam structure has a free volume of less than 60 vol. % In this respect the free volume is understood to mean the volume of the material that can be accessed by resin. The remainder of the volume will be a closed cell foam structure (and some fibres). The closed cell foam structure can be prepared from a mechanically stable binder foam that is printed into the web, or from (optionally expandable) microspheres which are introduced into the web using an optionally foamed binder material. Depending on which approach is chosen, different production methods will be used.

A preferred web comprises at least 20 wt. % of fibres, up to 80 wt. % of binder material, optionally also containing. expandable microspheres, having an activation temperature of at least 120° C., whereby the free volume in the web is at most 60 vol. %. The web may be mechanically, physically or chemically bonded.

In a further preferred embodiment the core material has a bending stiffness which allows it to be easily bended around corners with a radius of less than 10 mm. This provides therefore that the material can be draped in a good way in the mould, thus enabling the production of smoothly shaped products.

The core material of the invention may be prepared using techniques known for producing the prior art core materials for the manual production of fibre reinforced plastic materials.

As has been indicated above, the production depends at least partly on the embodiment chosen. Turning first to the system without microspheres, the core material may be produced by providing a suitable non-woven, prepared from useful fibres, such as glass fibres, polyester fibres, polyester-polyethylene bicomponent fibres and combinations thereof. Also substrates like wovens, knittings, and plastic foam materials may be used. The material, already possessing the necessary thickness, is provided with a foam structure, preferably by screen printing a mechanically stable foam into the non-woven. This technique is i.a. described in European patent application No 184,596. The mechanically stable foam can be prepared by foaming a binder material solution or dispersion in a suitable solvent, such as water. The amount of binder in the foam should be such, that the foam structure is maintained during screen printing and drying, resulting in the presence of a foam structure in the non-woven with at least part of the foam cells being closed cells. In this way a core material according to the invention may be prepared.

In an alternative method the non-woven may be printed with a foam or an unfoamed binder, also containing expanded microspheres, such as polymeric, glass or ceramic microspheres. By careful selection of the type and amount of binder, the type and amount of microspheres and the properties of the non-woven (thickness, stiffness of fibres and the like) a core material having the required advantageous properties may be produced. The foam itself may also be mechanically stable, In the case of use of expandable microspheres, it is preferred to use the following process. First a dispersion of expandable microspheres in a binder material is prepared, which dispersion is optionally foamed. The initial expansion temperature of the microspheres is preferably below the curing temperature of the binder material. Subsequently, the non-woven, having a thickness less than the required final thickness, is screen printed with the dispersion. Following this, the material is dried and heated to the expansion temperature of the microspheres. Upon expansion the temperature is further raised with the result that the binder material cures and sets the microspheres in the web. In this way a core material according to the invention can be prepared.

The initial expansion temperature of the microspheres is preferably between 120 and 190° C. The curing temperature of the binder will preferably be above 170° C.

According to a very convenient method, the non-woven will be based on a combination of polyester fibres and polyethylene-polyester bicomponent fibres (or other low temperature melting fibres or powders). These types of webs have been thermally bonded by the bicomponent fibres. By heating the web to the initial expansion temperature of the microspheres, which is above the melting point of the polyethylene bond, the web becomes loose and will expand easily. After expansion, and curing the final material again has its good bond, resulting in the advantageous combination of properties of the invention. At the same time the web is very easy to handle at the initial stages of the process, thanks to the thermal bonding.

The fibrous web to be used according to the invention will usually be a non-woven, which may be reinforced, based on conventional fibres. The manufacture of suitable non-wovens has for instance been described by Dr. H. Jörder, Textilien auf Vliesbasis (D. V. R. Fachbuch, P. Kepper Verlag). It is also possible to use a combination of a non-woven fibrous web with a reinforcing fabric, one within or on top of the other.

The fibres of the web are preferably selected from the group of natural fibres, glass fibres, metal fibres, ceramic fibres or synthetic fibres, such as acrylic, polyethylene, polypropylene, polyester, polyamide (aramide), carbon or polypropylene fibres and combinations thereof. According to a more preferred embodiment the fibres are selected from the group of glass fibres, polyester fibres, polyester-polyethylene bicomponent fibres and combinations thereof.

The microspheres that may be provided in a fibrous web according to the invention preferably consist of a thermoplastic synthetic resin material that is solid at room temperature. Examples of suitable resins include polystyrene, styrene copolymers, polyvinyl chloride, vinyl chloride copolymers, vinylidene chloride copolymers and so forth.

In the microspheres, a blowing agent has been incorporated. The presence of this blowing agent is responsible for an expansion of the microspheres when a fibrous web, comprising the microspheres, is cured. Thus, the microspheres are pressed into the fibrous web in unexpanded form, for example by means of a paste, such as a foam paste. The blowing agent may be a chemical or physical blowing agent, such as azodicarbonamide, isobutane, freon and so forth.

The microspheres advantageously have a diameter of 4–20 $\mu$m in unexpanded state, and a diameter of preferably 10–100 $\mu$m in expanded state. After expansion of the microspheres, the amount thereof in the web is in general 10 to 60 vol. %. This amount depends on the amount of microspheres used and the degree of expansion thereof.

In accordance with one embodiment, the microspheres are distributed homogeneously throughout the fibrous web. According to this embodiment, the microspheres may be provided in the web by impregnation techniques.

In another embodiment, which is preferred in view of the accessibility for the resin (resin flow properties), the microspheres are disposed mainly within the web and arranged in a pattern in which areas of the web which contain microspheres are separated from each other by areas which contain virtually no microspheres. In a fibrous web in accordance with this embodiment, the microspheres may be arranged so as to form a pattern of 'islands', which are separated from each other by areas (channels) containing no microspheres, but only fibres. Preferably, the microspheres are arranged in a regular pattern.

Suitable binders in this regard are for instance lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, polyvinyl acetate, partially hydrolyzed polyvinyl acetate, polyvinyl alcohol, polyvinyl pyrrolidone, polyester resins, and so forth. Optionally these binders can be provided with acidic groups, for example by carboxylating the binders. A suitable carboxylating agent is, for example, maleic anhydride. In addition, the binder, paste-like composition optionally contains water, surfactants, foam stabilizers, fillers and or thickeners, as has been described in EP-A-0 190 788.

Of course, the invention also encompasses a method for manufacturing a shaped article, wherein a fibrous web as described hereinabove is impregnated with a liquid resin and a hardener therefor.

Suitable liquid resins for impregnating a fibrous web according to the invention are any synthetic plastic materials that can be applied in liquid form and be cured. Examples are polyester resins, phenolresins, melamine formaldehyde resins and epoxy resins. Given the specifications of a shaped article to be manufactured, a skilled artisan will be able to suitably select an appropriate resin.

Suitable hardeners for use in a method according to the invention are any hardeners which can be used to cure the chosen liquid resin. These systems are known to the skilled person. It belongs to the standard knowledge of the person skilled in the art to be able to combine resin and hardener so as to obtain optimum results.

The invention will now be elucidated by the following, non-restrictive example.

EXAMPLE

A combination of non-woven fleeces was prepared, based on a central layer of glass-fibres and non-woven top-layers of polyester/PES-PE bico fibres.

An aqueous binder mixture was prepared consisting of about 45 kg of an acrylate dispersion, about 1 kg Solvitose and about 2 kg expandable microspheres(all based on dry matter; the dry solids content was 53.6%).

The binder mixture was applied in a hexagonal pattern to the above fleece, using rotogravure printing.

After drying the fleece at about 100° C., it was expanded to a thickness of 3 mm and cured at a temperature of about 180° C.

The resulting material showed a very good porosity in combination with high compression resistance. The compression-resistance was 95% at 1 bar pressure, and the permeability for resin was $1 \times 10^{-8}$ m$^2$.

What is claimed is:

1. A core material suitable for use in closed mould systems, based on at least one fibrous web containing a foam-structure within the web, said core material being drapable, having a compression-resistance of greater than 90% at 1 bar pressure, and a permeability for resin along the plane of the material of more than $5 \times 10^{-9}$ m$^2$, wherein said foam-structure comprises foam cells, at least part of said foam cells being closed cells.

2. A core material according to claim 1, wherein the free volume of the web is less than 60% by volume.

3. A core material according to claim 1, wherein the fibrous web contains microspheres.

4. A core material according to claim 3, wherein the microspheres are selected from the group consisting of glass, ceramic and thermoplastic microspheres.

5. A core material according to claim 3, wherein the microspheres are disposed within or upon the web and arranged in a pattern in which areas of the web which contain microspheres are separated from each other by areas which contain no microspheres.

6. A core material according to claim 1, wherein the web contains a foam structure based on a mechanically stable foamed binder composition.

7. A core material according to claim 1, having a drapability which allows it to be easily bent around a corner with a radius of less than 10 mm.

8. A core material according to claim 1, comprising at least 20 wt. % of fibers and up to 80 wt. % of binder material, wherein the free volume of the web is at most 60% by volume.

9. A core material according to claim 8, further comprising expandable microspheres having an activation temperature of at least 120° C.

10. A core material according to claim 9, wherein the expandable microspheres are present in the web, said microspheres having an initial expansion temperature below the curing temperature of the binder.

11. A core material according to claim 1, wherein the fibers of the web are selected from the group consisting of natural fibers, glass fibers, metal fibers, ceramic fibers and synthetic fibers, such as acrylic, polyethylene, polypropylene, polyester, polyamide (aramide), polyester-polyethylene bicomponent fibers, carbon or polypropylene fibers and combinations thereof.

12. A core material according to claim 10, wherein the fibrous web is based on a combination of polyester fibers and polyester-polyethylene bicomponent fibers.

13. A core material according to claim 8, wherein the binder material is selected from the group consisting of lower alkyl acrylate polymer, styrene-butadiene rubber, acrylonitrile polymer, polyurethane, epoxy resins, polyvinyl chloride, polyvinylidene chloride, copolymers of vinylidene chloride with other monomers, polyvinyl acetate, partially hydrolyzed polyvinyl acetate, polyvinyl alcohol, polyvinyl pyrrolidone and polyester resins.

14. A core material according to claim 1, wherein the fibrous web is non-woven.

15. A core material according to claim 14, wherein said non-woven fibrous web is combined with other non-woven fibrous webs.

16. A core material according to claim 15, wherein said combination is based on a central layer of glass fibers and non-woven top layers of polyester-polyethylene bicomponent fibers.

* * * * *